Aug. 11, 1931.  S. G. BAITS  1,818,031
STEERING COLUMN SUPPORT
Filed Jan. 22, 1929  2 Sheets-Sheet 1
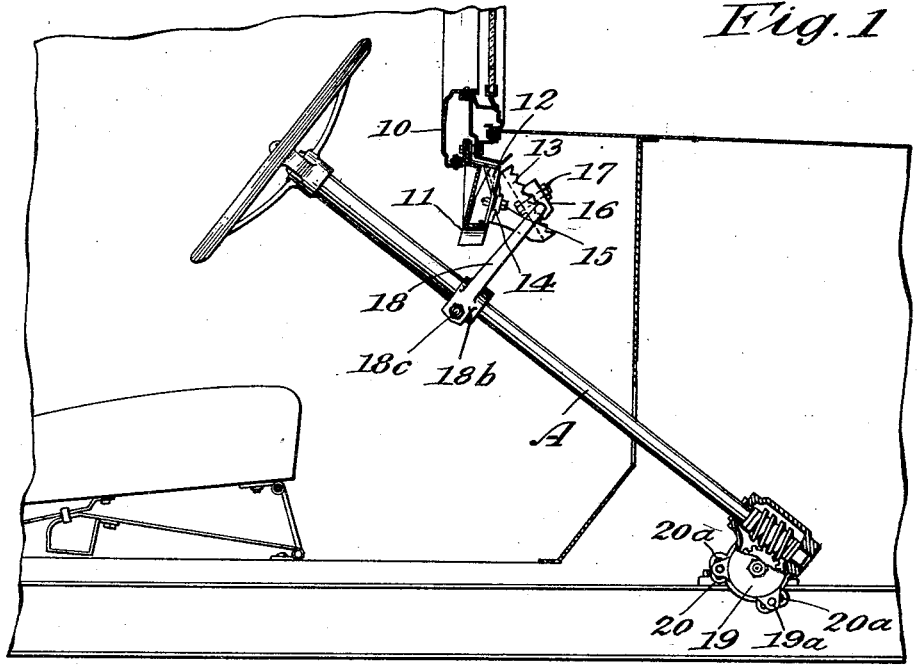
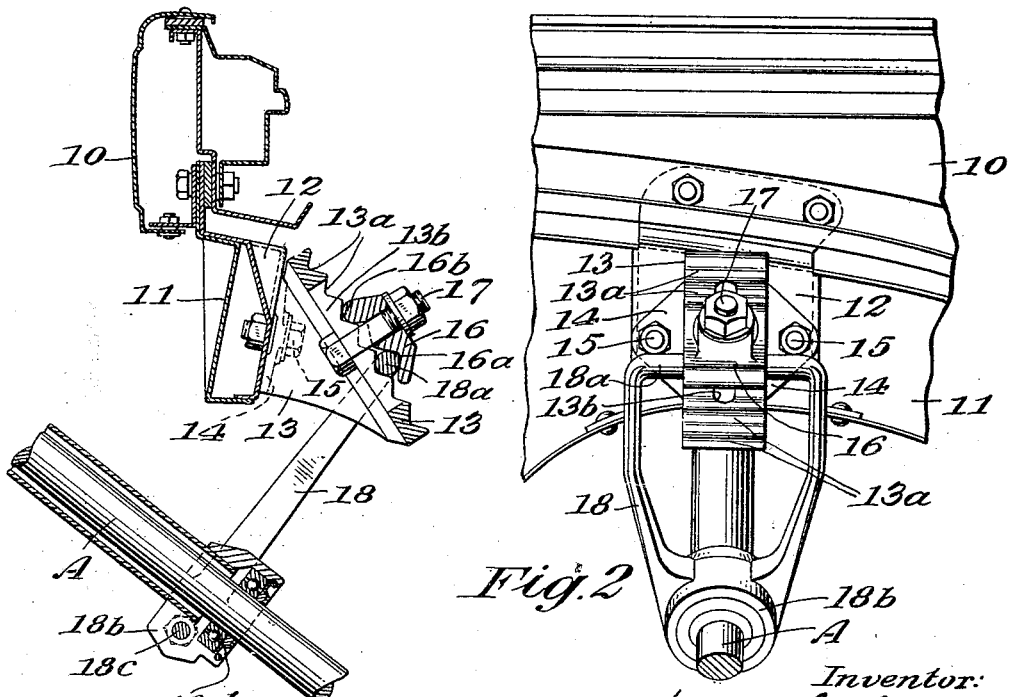
Inventor:
Stuart G. Baits
By Macleod, Calver, Copeland & Dike
Attorneys.

Aug. 11, 1931. S. G. BAITS 1,818,031
STEERING COLUMN SUPPORT
Filed Jan. 22, 1929   2 Sheets-Sheet 2

Inventors:
Stuart G. Baits
By Macleod, Calver, Copeland & Dike
Attorneys.

Patented Aug. 11, 1931

1,818,031

UNITED STATES PATENT OFFICE

STUART G. BAITS, OF GROSSE POINTE PARK, MICHIGAN, ASSIGNOR TO HUDSON MOTOR CAR COMPANY, OF DETROIT, MICHIGAN, A CORPORATION OF MICHIGAN

STEERING COLUMN SUPPORT

Application filed January 22, 1929. Serial No. 334,265.

This invention relates to steering column supports for automobiles and particularly to a support adapted to be adjusted so as to vary the position of the steering column and wheel with respect to the driver's seat and instrument board of the automobile.

An object of the invention is to provide supporting means capable of quick and easy adjustment which provides, after such adjustment has been effected, a rigid support for the steering column capable of maintaining it against vibration or rattling. Other objects of the invention will appear as the description proceeds.

In the drawings:

Fig. 1 is a fragmentary view of an automobile equipped with the steering column support of this invention.

Fig. 2 is an enlarged fragmentary view showing the support and looking toward the left of Fig. 1.

Fig. 3 is an enlarged sectional view of the steering column support applied to the instrument panel and steering column.

Figure 4:
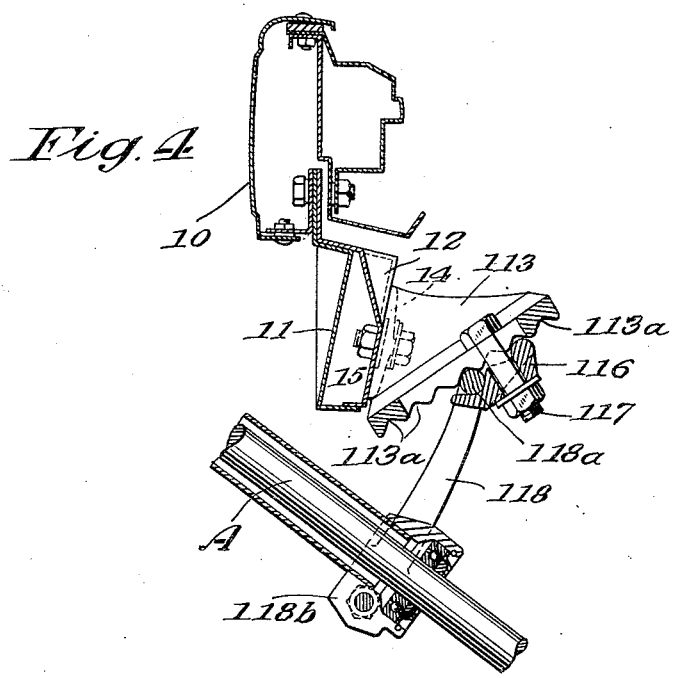
Fig. 4 is a view similar to Fig. 3 showing another form of construction.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

Referring now to the drawings, 10 represents in general the dash of an automobile body which includes the usual instrument board 11, and a bracket 12 connected to the outer face of the instrument board by bolts, rivets or the like. Secured to the bracket 12 as by means of bolts, is a fixed metal clamping block 13 having projections forming ears 14 which apertured. The ears 14 provide means for attaching the block to the bracket as by means of bolts 15. One face, as illustrated in Figs. 1, 2 and 3, the top or outer face of the block is provided with a plurality of laterally extending notches or grooves 13a and with a centrally disposed longitudinal slot 13b. Another clamping member or block 16, having complementary transverse grooves 16a therein, is provided and maintained normally in contact with the grooves or notches 13a by means of a bolt 17 which passes through the slot 13b. It will be seen that the upper projecting edge of this clamping block 16 is rounded at 16b to fit into any one of the notches 13a.

Means for connecting the steering column and the bracket 13 and for varying the relative positions thereof is provided. In the present instance, such means is a member in the form of a yoke or stirrup 18 having at its upper end a transverse connecting bar or portion 18a and an integral cylindrical sleeve portion 18b at its lower end. The cylindrical sleeve portion 18b is preferably in the form of a split ring adapted to be drawn tight around the steering column A by a bolt 18c. The member 18b supports, preferably, a ball race and ball bearings 18d and which, when the bolt 18c is loosened, will permit the member to be moved along the steering column A, the ball bearings eliminating friction and permitting easy movement.

As shown in the drawings the bar 18a of the yoke or stirrup is held in engagement with any one of the grooves or notches 13a by means of the clamping block 16, it being merely necessary to loosen the bolt 17 to permit the portion 18a to be moved from one notch to another.

Since the steering column and wheel are adjusted relative to the driver's seat and dash, it is important that the lower end of the steering post and column be permitted to have a slight pivotal movement adjacent the point where the post cooperates with the steering mechanism of the automobile. To allow this, the housing 19 of the steering mechanism may be provided with projecting ears 19a adapted to cooperate with a bracket 20 carried by the frame of the car. This bracket is provided with slots 20a. Bolts or pins are inserted in the ears and slots to limit the relative movement of the parts.

When it is desired to adjust the position of the steering column and wheel with respect to the driver's seat, it is simply necessary to release the bolt 17 and the bolt 18c after which it is possible to slide the clamping member or block 16 over the notch or serrated surface of the bracket 13 and to slide the lower end of the hanger along the steering column A. When the bar or portion 18a of the hanger is in engagement with the proper notch, the bolts 17 and 18c are again tightened to fix the parts in their adjusted position.

Figure 5:
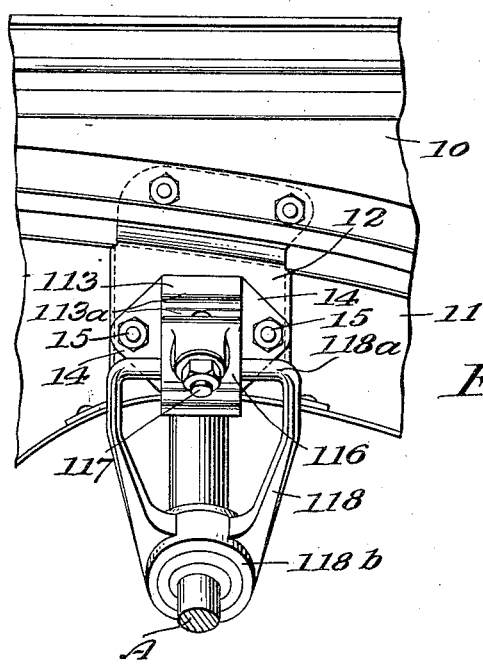
Fig. 5 is a view similar to Fig. 2, showing the modified construction.

In Figs. 4 and 5, there is shown another form of the invention in which the position of the metal clamping block 113 is reversed so that the face with the corrugations or serrations 113a is on the underside toward the steering column. It will be noted that the upper portion 118a of the hanger or stirrup 118 is held against the under face of the block and in the corrugations by means of the clamping block 116 and bolt 117. In other respects, the construction of Figs. 4 and 5 is identical with that shown in the preceding figures. The arms of the stirrup may be curved if desired, as shown in Fig. 4. This construction, in practice, has the advantage of rendering the parts more accessible for the purposes of quick adjustment of the steering wheel.

From the foregoing it will be seen that I have provided a steering column support in which one end of a supporting hanger or stirrup is clamped between relatively adjustable members having notched or corrugated faces, one of the members being mounted upon the automobile dash and the other held in adjustable engagement therewith through the medium of a bolt and slot connection.

I claim:

1. In a device for adjustably supporting a steering column from the dash of a vehicle having a hanger member for supporting the steering column, the combination therewith of means for adjustably supporting the upper end of the hanger member comprising a support carried by the dash and having a plurality of spaced notches adapted to receive the upper end portion of said hanger, and a clamping member adjustably secured on said support adapted to hold the upper end portion of said hanger in any one of said notches.

2. In a device for adjustably supporting a steering column from the dash of a vehicle having a hanger member for supporting the steering calumn, the combination therewith of means for adjustably supporting the upper end of the hanger member comprising a support carried by the dash and having a plurality of spaced notches adapted to receive the upper end portion of said hanger, and a clamping member adjustably secured on said support having a recess and a projection, said recess being adapted to receive the upper end portion of said hanger and said projection being adapted to engage one of said notches.

In testimony whereof I affix my signature.

STUART G. BAITS.